United States Patent
Su et al.

(10) Patent No.: US 11,251,820 B2
(45) Date of Patent: Feb. 15, 2022

(54) CIRCUIT FOR PROCESSING RADIO FREQUENCY SIGNAL

(71) Applicant: SMARTER MICROELECTRONICS (GUANG ZHOU) CO., LTD., Guangzhou (CN)

(72) Inventors: Qiang Su, Guangzhou (CN); Dajie Dai, Guangzhou (CN); Zhenfei Peng, Guangzhou (CN)

(73) Assignee: SMARTER MICROELECTRONICS (GUANG ZHOU) CO., LTD., Guangzhou (CN)

( * ) Notice: Subject to any disclaimer, the term of this patent is extended or adjusted under 35 U.S.C. 154(b) by 0 days.

(21) Appl. No.: 17/134,470

(22) Filed: Dec. 27, 2020

(65) Prior Publication Data

US 2021/0211148 A1    Jul. 8, 2021

Related U.S. Application Data

(63) Continuation of application No. PCT/CN2020/117239, filed on Sep. 23, 2020.

(30) Foreign Application Priority Data

Jan. 3, 2020 (CN) .......................... 202010005215.8

(51) Int. Cl.
*H04B 1/04* (2006.01)
(52) U.S. Cl.
CPC ......... *H04B 1/0483* (2013.01); *H04B 1/0458* (2013.01); *H04B 2001/0408* (2013.01)
(58) Field of Classification Search
CPC .......... H03F 1/301; H03F 1/302; H03F 1/306; H03F 1/56; H03H 1/02; H03H 7/38; H03K 19/094; H03K 19/09403; H03K 19/0944; H04B 1/0458; H04B 1/0475; H04B 1/0483; H04B 2001/0408; H04L 25/0264; H04L 25/0272; H04L 25/0278; H04L 25/028
USPC ........ 375/257, 295, 297; 326/30, 68, 82–84; 327/403, 407, 408, 430, 434, 437; 330/264, 269, 277, 300; 333/124, 32, 333/172
See application file for complete search history.

(56) References Cited

U.S. PATENT DOCUMENTS

2005/0104679 A1* 5/2005 Blednov ................. H01L 24/49
                                                                333/32
2012/0025927 A1* 2/2012 Yan ....................... H03K 17/063
                                                                333/103

(Continued)

*Primary Examiner* — Young T. Tse
(74) *Attorney, Agent, or Firm* — Syncoda LLC; Feng Ma

(57) ABSTRACT

A circuit for processing radio frequency signal includes a first path and at least one other second path; herein the first path includes at least one radio frequency amplification device; a first radio frequency current generated by parasitic capacitance of the at least one radio frequency amplification device flows through the at least one second path; the circuit for processing the radio frequency signal further includes at least one resonance module, a first end of each of the at least one resonance module is connected with the first path, and a second end of each of the at least one resonance module is connected with at least a part of second paths of the at least one second path; and the at least one resonance module is configured to generate a resonance current opposite to the first radio frequency current.

20 Claims, 10 Drawing Sheets

(56) References Cited

U.S. PATENT DOCUMENTS

2014/0206301 A1\* 7/2014 Geddada ................ H04B 1/18
 455/83
2017/0146591 A1\* 5/2017 Nobbe ............... G01R 31/2856
2019/0154774 A1\* 5/2019 Hushek ............ G01R 33/34007

\* cited by examiner

CIRCUIT FOR PROCESSING RADIO FREQUENCY SIGNAL

CROSS-REFERENCE TO RELATED APPLICATIONS

This application is a continuation of International Application No. PCT/CN2020/117239 filed on Sep. 23, 2020, which claims priority to Chinese Patent Application No. 202010005215.8 filed on Jan. 3, 2020. The disclosures of these applications are hereby incorporated by reference in their entirety.

BACKGROUND

With the development of communication technology, higher requirements are put forward for the performance of radio frequency power amplifier, and as an important part of radio frequency front-end, the radio frequency amplifier is capable of amplifying radio frequency signals.

SUMMARY

The embodiments of the disclosure provide a circuit for processing radio frequency signal, which may reduce the effect of parasitic capacitance on the gain of the circuit for processing radio frequency signal and effectively reduce the degree of the parasitic capacitance deteriorating signals in radio frequency amplification devices.

The embodiments of the disclosure provide a circuit for processing radio frequency signal, including a first path and at least one second path; herein the first path includes at least one radio frequency amplification device; and a first radio frequency current generated by parasitic capacitance of the at least one radio frequency amplification device flows through the at least one second path;

the circuit for processing radio frequency signal further includes at least one resonance module, a first end of each of the at least one resonance module is connected with the first path, and a second end of each of the at least one resonance module is connected with at least a part of second paths of the at least one second path;

the resonance module is configured to generate a resonance current opposite to the first radio frequency current.

In some embodiments of the disclosure, the resonance module includes a first capacitor and a first inductor; a first end of the first capacitor is connected with the first path; a second end of the first capacitor is connected with a first end of the first inductor; and a second end of the first inductor is connected with the second path.

In some embodiments of the disclosure, the at least one radio frequency amplification device includes a first radio frequency amplification device, a second end of the first radio frequency amplification device is connected with an input end; a third end of the first radio frequency amplification device is connected with an output end; the second path includes a second inductor; a first end of the second inductor is connected with a first end of the first radio frequency amplification device; and a second end of the second inductor is grounded;

the circuit for processing radio frequency signal includes a first resonance module; a first end of a first capacitor of the first resonance module is connected with the third end of the first radio frequency amplification device; a second end of the first capacitor of the first resonance module is connected with a first end of a first inductor of the first resonance module; and a second end of the first inductor of the first resonance module is connected with the first end of the first radio frequency amplification device and the first end of the second inductor respectively.

In some embodiments of the disclosure, the at least one radio frequency amplification device includes a first radio frequency amplification device, a second end of the first radio frequency amplification device is connected with an input end; a third end of the first radio frequency amplification device is connected with an output end; the second path includes a second inductor; a first end of the second inductor is connected with a first end of the first radio frequency amplification device; and a second end of the second inductor is grounded;

the circuit for processing radio frequency signal includes a first resonance module; a first end of a first capacitor of the first resonance module is connected with the second end of the first radio frequency amplification device; a second end of the first capacitor of the first resonance module is connected with a first end of a first inductor of the first resonance module; and a second end of the first inductor of the first resonance module is connected with the first end of the first radio frequency amplification device and the first end of the second inductor respectively.

In some embodiments of the disclosure, the circuit for processing radio frequency signal further includes a second resonance module;

herein a first end of a first capacitor of the second resonance module is connected with a second end of the first radio frequency amplification device; a second end of the first capacitor of the second resonance module is connected with a first end of a first inductor of the second resonance module; and a second end of the first inductor of the second resonance module is connected with the first end of the first radio frequency amplification device, the second end of the first inductor of the first resonance module and the first end of the second inductor respectively.

In some embodiments of the disclosure, the at least one radio frequency amplification device includes a first radio frequency amplification device and a second radio frequency amplification device; herein a second end of the first radio frequency amplification device is connected with an input end; a first end of the second radio frequency amplification device is connected with a third end of the first radio frequency amplification device; a third end of the second radio frequency amplification device is connected with an output end; the second path includes a second inductor; a first end of the second inductor is connected with a first end of the first radio frequency amplification device; and a second end of the second inductor is grounded;

the circuit for processing radio frequency signal includes a first resonance module; a first end of a first capacitor of the first resonance module is connected with the third end of the first radio frequency amplification device and the first end of the second radio frequency amplification device respectively; a second end of the first capacitor of the first resonance module is connected with a first end of a first inductor of the first resonance module; and a second end of the first inductor of the first resonance module is connected with a second end of the second inductor.

In some embodiments of the disclosure, the at least one radio frequency amplification device includes a first radio frequency amplification device and a second radio frequency amplification device; herein a second end of the first radio frequency amplification device is connected with an input end; a first end of the second radio frequency amplification device is connected with a third end of the first radio frequency amplification device; a third end of the second radio frequency amplification device is connected with an output end; the second path includes a second inductor; a first end of the second inductor is connected with a first end of the first radio frequency amplification device; and a second end of the second inductor is grounded;

the circuit for processing radio frequency signal includes a first resonance module; a first end of a first capacitor of the first resonance module is connected with the third end of the first radio frequency amplification device and the first end of the second radio frequency amplification device respectively; a second end of the first capacitor of the first resonance module is connected with a first end of a first inductor of the first resonance module; and a second end of the first inductor of the first resonance module is connected with the first end of the first radio frequency amplification device and the first end of the second inductor respectively.

In some embodiments of the disclosure, the at least one radio frequency amplification device includes a first radio frequency amplification device and a second radio frequency amplification device; herein a second end of the first radio frequency amplification device is connected with an input end; a first end of the second radio frequency amplification device is connected with a third end of the first radio frequency amplification device; a third end of the second radio frequency amplification device is connected with an output end; the second path includes a second inductor; a first end of the second inductor is connected with a first end of the first radio frequency amplification device; and a second end of the second inductor is grounded;

the circuit for processing radio frequency signal includes a first resonance module; a first end of a first capacitor of the first resonance module is connected with the second end of the first radio frequency amplification device; a second end of the first capacitor of the first resonance module is connected with a first end of a first inductor of the first resonance module; and a second end of the first inductor of the first resonance module is connected with the first end of the first radio frequency amplification device and the first end of the second inductor respectively.

In some embodiments of the disclosure, the circuit for processing radio frequency signal further includes a second resonance module;

herein a first end of a first capacitor of the second resonance module is connected with the second end of the first radio frequency amplification device; a second end of the first capacitor of the second resonance module is connected with a first end of a first inductor of the second resonance module; and a second end of the first inductor of the second resonance module is connected with the first end of the first radio frequency amplification device and the first end of the second inductor respectively.

In some embodiments of the disclosure, the circuit for processing radio frequency signal further includes a second resonance module;

herein a first end of a first capacitor of the second resonance module is connected with a second end of the first radio frequency amplification device; a second end of the first capacitor of the second resonance module is connected with a first end of a first inductor of the second resonance module; and a second end of the first inductor of the second resonance module is connected with the first end of the first radio frequency amplification device, the second end of the first inductor of the first resonance module and the first end of the second inductor respectively.

According to the circuit for processing radio frequency signal provided by the embodiments of the disclosure, by setting a resonance module in the circuit for processing radio frequency signal, connecting a first end of the resonance module with a first path of the circuit for processing radio frequency signal, connecting a second end of the resonance module with a second path of the circuit for processing radio frequency signal, and by generating a resonance current, through the resonance module, that is opposite to the first radio frequency current generated through the parasitic capacitance of the radio frequency amplification device of the first path, and by offsetting, through the resonance current, the first radio frequency current generated by the parasitic capacitance of the radio frequency amplification device, the radio frequency signal flowing into the second path is reduced, the radio frequency signal of the first path is increased, thereby reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

The circuit can be part of, for example, an electronic apparatus of a communication system.

BRIEF DESCRIPTION OF THE DRAWINGS

In the drawings (which are not necessarily drawn to scale), the same number may describe similar components in different views. The same number with different letter suffixes may represent different examples of similar components. The drawings generally exemplify, by way of example rather than limitation, various embodiments discussed in this disclosure.

DETAILED DESCRIPTION

Before explaining the circuit for processing radio frequency signal of the embodiments of the disclosure in detail, the problems proposed in the embodiments of the disclosure are briefly explained.

In a radio frequency amplifier, taking the Metal-Oxide-Semiconductor Field-Effect Transistor (MOSFET) device as an example, parasitic capacitance exists between any two of the source, gate and drain, so that some input signals are absorbed by the parasitic capacitance, which reduces the output signal at the output end, resulting in lower gain, lower efficiency and slightly deteriorated saturation power. Moreover, with the increasing frequency of wireless communication, the parasitic capacitance in the device becomes larger and larger, which also makes the gain deterioration caused by the parasitic capacitance more apparent.

Figure 1:
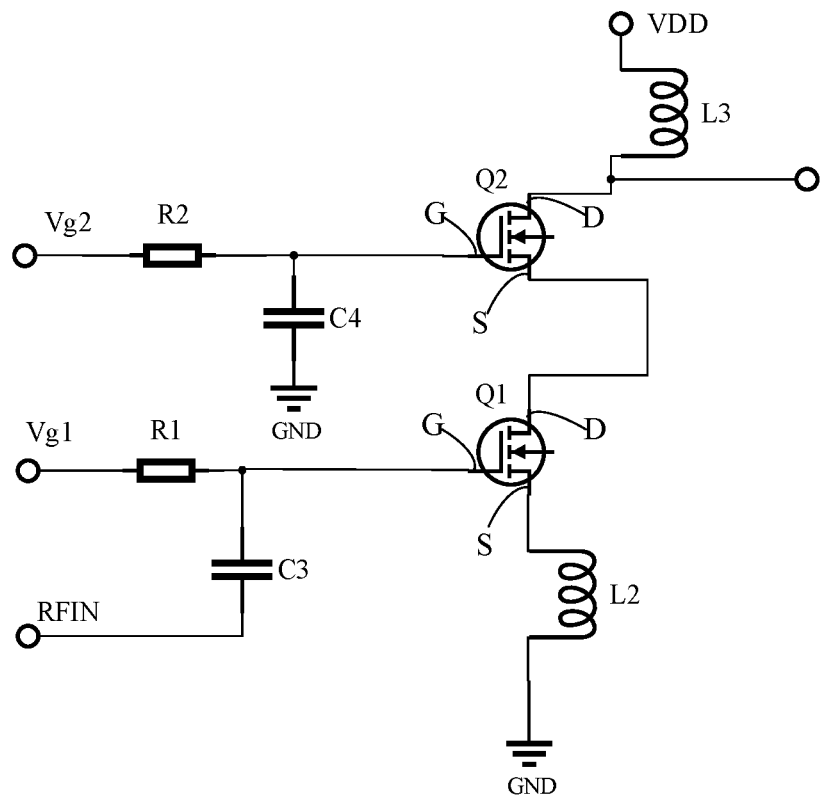
FIG. 1 is a schematic diagram of a radio frequency amplification circuit according to some embodiments.

FIG. 1 is a schematic diagram of a radio frequency amplification circuit according to some embodiments, and taking a radio frequency amplification device being a MOS device as an example, as illustrated in FIG. 1, taking two MOS devices, i.e. a Metal Oxide Semiconductor (MOS) device Q1 and a MOS device Q2, which are included in a radio frequency amplification circuit, as an example, in a conventional radio frequency amplification circuit, there are three operating ends for a MOS device forming the radio frequency amplification circuit: gate, drain and source, and parasitic capacitance exists between two different operating ends, such as gate-source parasitic capacitance (Cgs), gate-drain parasitic capacitance (Cgd) and drain-source parasitic capacitance (Cds). When radio frequency signals are input from a radio frequency input end (RFIN) of radio frequency amplification circuit, a part of the radio frequency signals are absorbed by drain-source parasitic capacitance (Cds) of MOS amplification device Q1 and gate-source parasitic capacitance (Cgs) of MOS amplification device Q2 through which they flow, so that they are not able to flow into the radio frequency main path, and then output from radio frequency output end (RFOUT) of radio frequency amplification circuit, so that the output signal of the radio frequency output end (RFOUT) is reduced, resulting in problems of lower gain, reduced efficiency of the amplification circuit, slightly deteriorated saturation power. In addition, when the radio frequency amplification circuit is grounded, there will also be a parasitic inductance in the connection bus between the source of the MOS device of the circuit and the ground, and in an embodiment, in some actual circuits, the parasitic inductance may be the actually existing inductor, while causing interference to the amplification circuit, reducing the radio frequency signal output from the radio frequency output end (RFOUT), thereby reducing the gain of the circuit.

The embodiments of the disclosure will be described below in further detail with reference to the drawings and embodiments. It should be understood that the specific embodiments described herein are only used to explain the embodiments of the disclosure, and are not used to limit the embodiments of the disclosure.

Figure 2:
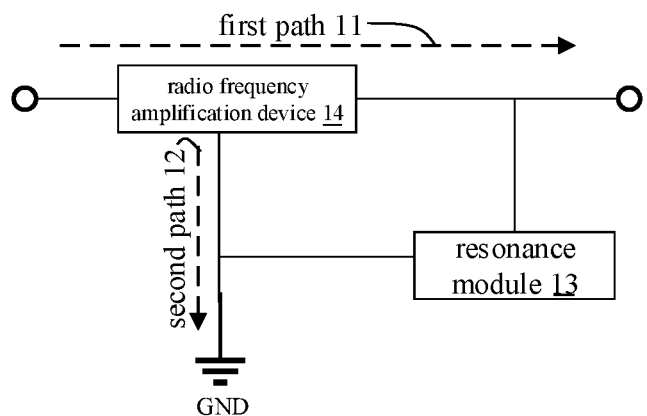
FIG. 2 is a schematic diagram of an alternative compositional structure of a circuit for processing radio frequency signal of an embodiment of the disclosure.

FIG. 2 is a schematic diagram of an alternative compositional structure of a circuit for processing radio frequency signal of an embodiment of the disclosure, as illustrated in FIG. 2, the circuit for processing radio frequency signal includes a first path 11 and at least one second path 12; herein the first path 11 includes at least one radio frequency amplification device 14; and a first radio frequency current generated by parasitic capacitance of the at least one radio frequency amplification device 14 flows through the at least one second path 12; the circuit for processing radio frequency signal further includes at least one resonance module 13, a first end of each of the at least one resonance module 13 is connected with the first path 11, and a second end of each of the at least one resonance module 13 is connected with at least a part of second paths 12 of the at least one second path 12; the resonance module 13 is configured to generate a resonance current opposite to the first radio frequency current.

Herein, the first path 11 illustrated in FIG. 2 represents the signal flowing path through which the radio frequency signal is input from the radio frequency input end (RFIN), passes the radio frequency amplification device, and then output from the radio frequency output end (RFOUT), that is, the main path of the circuit for processing radio frequency signal; the second path 12 represents a signal flowing path in which the radio frequency signal input from the radio frequency input end (RFIN) flows into the ground end through the radio frequency amplification device due to the effect of parasitic capacitance of the radio frequency amplification device of the circuit, that is, a bypass path of the radio frequency signal processing circuit.

In the embodiments of the disclosure, the resonance module 13 has resonance property, that is, the resonance module includes an inductive device and a capacitive device, herein the inductive device and the capacitive device are connected in series, and the resonance frequency of the resonance module that includes the inductive device and the capacitive device is adjusted according to the operating frequency of the radio frequency amplification device in the radio frequency signal processing circuit, so as to generate resonance current to offset the effect of the parasitic capacitance of the radio frequency amplification device.

In some embodiments of the disclosure, the resonance module includes a first capacitor and a first inductor; a first end of the first capacitor is connected with the first path; a second end of the first capacitor is connected with a first end of the first inductor; and a second end of the first inductor is connected with the second path.

According to the technical solutions of the embodiments of the disclosure, in the circuit for processing radio frequency signal, by setting a resonance module in the circuit for processing radio frequency signal, and by generating a resonance current, through the resonance module, that is opposite to the first radio frequency current generated through the parasitic capacitance of the radio frequency amplification device, the radio frequency signal flowing into the second path is reduced, the radio frequency signal of the first path is increased, thereby reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

The circuit for processing radio frequency signal of the embodiments of the disclosure will be described in detail below with reference to specific scenarios.

First Scenario

Figure 3:
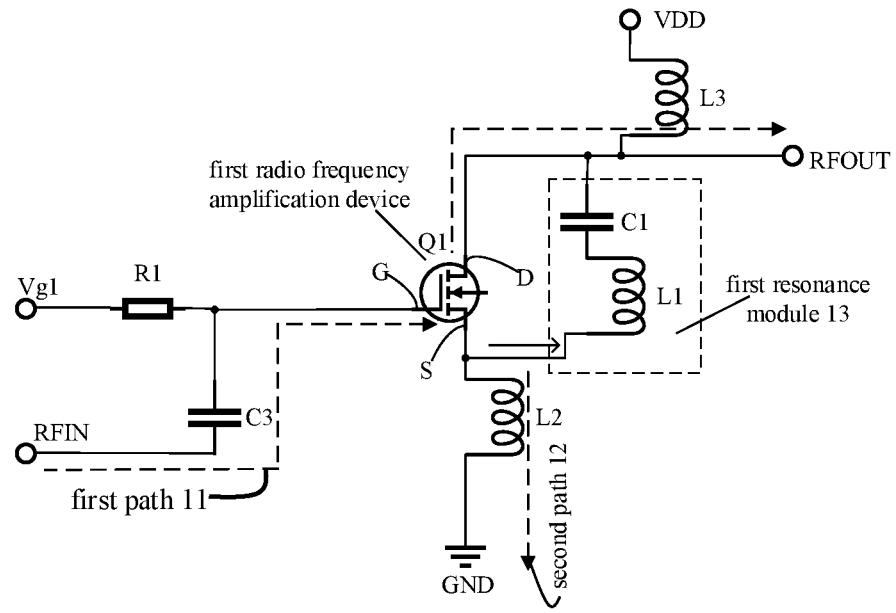
FIG. 3 is a schematic diagram of a first application of the circuit for processing radio frequency signal of an embodiment of the disclosure.

FIG. 3 is a schematic diagram of a first application of the circuit for processing radio frequency signal of an embodiment of the disclosure: in this scenario, the circuit for processing radio frequency signal includes a radio frequency amplification device, which is designated as a first radio frequency amplification device; the circuit for processing radio frequency signal further includes a resonance module, which is designated as a first resonance module. Specifically, as illustrated in FIG. 3, the circuit for processing radio frequency signal includes a first path 11 and a second path 12; the first path 11 includes a first radio frequency amplification device Q1, herein, the first radio frequency amplification device Q1 corresponds to the radio frequency amplification device 14 in FIG. 2; a second end of the first radio frequency amplification device Q1 is connected with an input end (RFIN); a third end of the first radio frequency amplification device Q1 is connected with an output end (RFOUT); the second path 12 includes a second inductor L2; a first end of the second inductor L2 is connected with a first end of the first radio frequency amplification device Q1; and a second end of the second inductor L2 is grounded. Here, referring to FIG. 3, a first end of the first radio frequency amplification device Q1 corresponds to the source of the first radio frequency amplification device Q1, which is designated by S in the figure, and a second end of the first radio frequency amplification device Q1 corresponds to the gate of the first radio frequency amplification device Q1, which is designated by G in the figure, and a third end of the first radio frequency amplification device Q1 corresponds to the drain of the first radio frequency amplification device Q1, which is designated by D in the figure.

In some embodiments, the first radio frequency amplification device Q1 may be an N-channel enhanced MOSFET device, and in such application scenario, the first radio frequency amplification device Q1 is a common source amplification transistor; in addition, the first radio frequency amplification device Q1 may also be a bipolar junction transistor (BJT), and in such application scenario, the first radio frequency amplification device Q1 is a common emitter amplification transistor.

In some embodiments, the second inductor L2 may be a parasitic inductance in some actual circuits or an inductor actually existing in some actual circuits.

In an embodiment, the first resonance module 13 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 13 is connected with the third end (drain) of the first radio frequency amplification device Q1; a second end of the first capacitor C1 of the first resonance module 13 is connected with a first end of the first inductor L1 of the first resonance module 13; and a second end of the first inductor L1 of the first resonance module 13 is connected with the first end (source) of the first radio frequency amplification device Q1 and the first end of the second inductor L2 respectively.

In this embodiment, the first capacitor C1 and the first inductor L1 are connected in series to form the first resonance module 13, and the first capacitor C1 needs to be selected to have a larger value to play a role of isolating DC. In some embodiments, the first capacitor C1 should be selected to have the value as large as possible within the operating frequency range in which the first radio frequency amplification device Q1 is located, provided that the operating frequency of the resonance module is lower than the operating frequency of the first radio frequency amplification device Q1 (e.g., the operating frequency of the resonance module is lower than one-tenth of the operating frequency of the first radio frequency amplification device Q1), to enhance the resonant effect of the resonance module; and since the first capacitor C1 and the first inductor L1 are connected in series to form a resonance module (the first resonance module 13 in this embodiment), the superimposed reactance value of the resonance module will be equal to the reciprocal of the value of the first capacitor C1 plus the value of the first inductor L1, and when the operating frequency of the resonance module is greater than the resonance frequency, the superimposition of the first capacitor C1 and the first inductor L1 in series is equivalent to the effect of the first inductor L1; and when the operating frequency of the resonance module is less than the resonance frequency, the superimposition of the first capacitor C1 and the first inductor L1 in series is equivalent to the effect of the first capacitor C1. When the resonance frequency of the resonance module is less than the operating frequency of the circuit and the first capacitor C1 and the first inductor L1 are equivalent to an inductor, the current generated by the resonance module is opposite to the radio frequency current generated by the parasitic capacitance of the first radio frequency amplification device Q1, and the current generated by the first resonance module 13 is illustrated by the direction of the arrow in FIG. 3. Therefore, the two currents will offset with each other.

Furthermore, since the first end of the second inductor L2 is connected with the first end (source) of the first radio frequency amplification device Q1, and the second end of the second inductor L2 is grounded, thus forming negative feedback at the source of the radio frequency amplification device; and by connecting the first resonance module 13 in parallel with the first end (source) of the first radio frequency amplification device Q1, the radio frequency signal flowing into the second inductor L2 may be reduced, which is equivalent to reducing the inductance of the first inductor L1 and obtaining a further gain improvement. In addition, the power gain of the first radio frequency amplification device Q1 is inversely proportional to the real part of the input admittance of the first resonance module 13, and an inductance value of the first inductor L1 is determined based on the operating frequency of the first radio frequency amplification device Q1 and the value of the parasitic capacitance of the first radio frequency amplification device Q1 itself to reduce the real part of the input admittance and to increase the power gain of the radio frequency amplification device.

In some embodiments, as illustrated in FIG. 3, the circuit for processing radio frequency signal further includes a first AC isolating resistor R1, a first DC isolating capacitor C3 and a first AC isolating inductor L3; herein, a first end of the first AC isolating resistor R1 is connected with a first bias voltage input end (Vg1), and a second end of the first AC isolating resistor R1 is connected with the second end (gate) of the first radio frequency amplification device Q1; the first DC isolating capacitor C3 is connected in series between the second end (gate) of the first radio frequency amplification device Q1 and the input end (RFIN); a first end of the first AC isolating inductor L3 is connected with the third end (drain) of the first radio frequency amplification device Q1, and a second end of the first AC isolating inductor L3 is connected with the drain power supply voltage VDD. The first bias voltage input end (Vg1) is configured to provide a proper bias voltage for the first radio frequency amplification device Q1 to make the first radio frequency amplification device Q1 operate in a required operating state, thereby ensuring that the common source (emitter) amplification transistor is in a linear amplification region; the first AC isolating resistor R1 is configured to isolate the first bias voltage input end (Vg1) from the radio frequency AC signal input by the radio frequency signal input end (RFIN); herein, the AC isolating resistor may be replaced by an AC isolating inductor in the circuit; the first DC isolating capacitor C3 is configured to prevent the bias DC from flowing into the ground or into the radio frequency signal input end (RFIN); the first AC isolating inductor L3 is configured to isolate the drain power supply voltage (VDD) from the radio frequency AC signal, so that all radio frequency AC signals are output via the radio frequency signal output end (RFOUT).

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the resonance module, that is opposite to the radio frequency current generated through the parasitic capacitance of the radio frequency amplification device, the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Second Scenario

Figure 4:
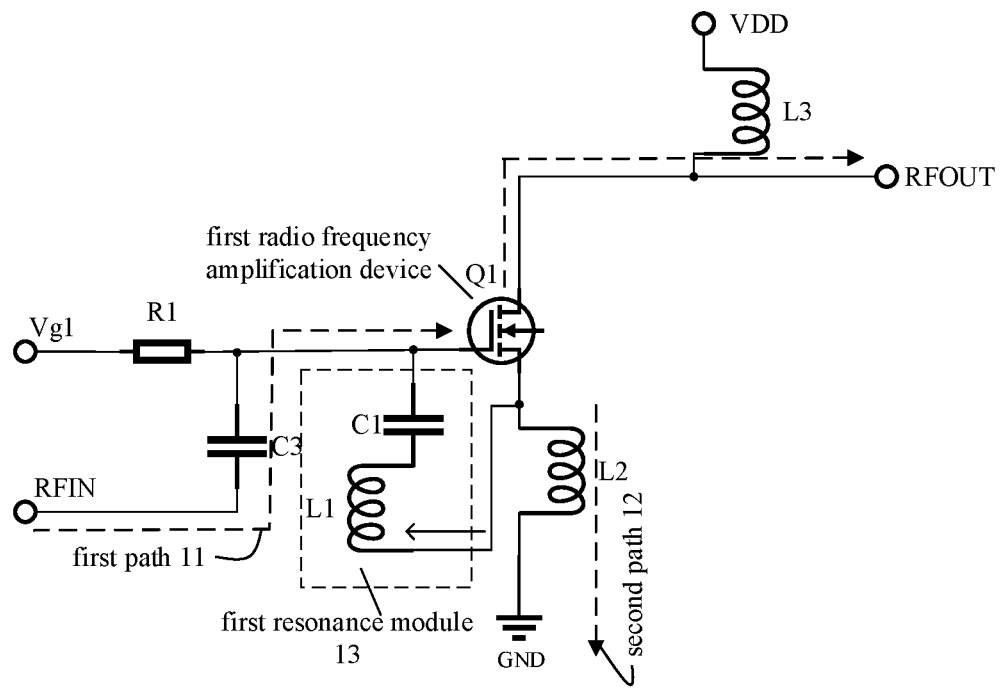
FIG. 4 is a schematic diagram of a second application of the circuit for processing radio frequency signal of an embodiment of the disclosure.

FIG. 4 is a schematic diagram of a second application of the circuit for processing radio frequency signal of an embodiment of the disclosure: in this scenario, the circuit for processing radio frequency signal includes a radio frequency amplification device, which is designated as a first radio frequency amplification device; the circuit for processing radio frequency signal further includes a resonance module, which is designated as a first resonance module. Specifically, as illustrated in FIG. 4, the circuit for processing radio frequency signal includes a first path 11 and a second path 12; the first path 11 includes a first radio frequency amplification device Q1, herein, the first radio frequency amplification device Q1 corresponds to the radio frequency amplification device 14 in FIG. 2; a second end (gate) of the first radio frequency amplification device Q1 is connected with an input end (RFIN); a third end (drain) of the first radio frequency amplification device Q1 is connected with an output end (RFOUT); the second path 12 includes a second inductor L2; a first end of the second inductor L2 is connected with a first end (source) of the first radio frequency amplification device Q1; and a second end of the second inductor L2 is grounded.

In some embodiments, the first radio frequency amplification device Q1 may be an N-channel enhanced MOSFET device, and in such application scenario, the first radio frequency amplification device Q1 is a common source amplification transistor; in addition, the first radio frequency amplification device Q1 may also be a bipolar junction transistor, i.e. BJT device, and in such application scenario, the first radio frequency amplification device Q1 is a common emitter amplification transistor.

In some embodiments, the second inductor L2 may be a parasitic inductance in some actual circuits or an inductor actually existing in some actual circuits.

In this embodiment, the first resonance module 13 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 13 is connected with the second end (gate) of the first radio frequency amplification device Q1; a second end of the first capacitor C1 of the first resonance module 13 is connected with a first end of the first inductor L1 of the first resonance module 13; and a second end of the first inductor L1 of the first resonance module 13 is connected with the first end (source) of the first radio frequency amplification device Q1 and the first end of the second inductor L2 respectively.

The specific description of each of the components in this embodiment may refer to the detailed description with reference to the corresponding component in the first scenario, in which the detailed description of each of the ends of the first radio frequency amplification device Q1 in this embodiment may also refer to that described with reference to the first scenario, which will not be repeated here. The resonance current generated by the first resonance module 13 may refer to the direction of the arrow in FIG. 4.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the resonance module, that is opposite to the radio frequency current generated through the parasitic capacitance of the radio frequency amplification device, the resonance current is offset with the radio frequency current generated through the parasitic capacitance, thereby reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Third Scenario

Figure 5:
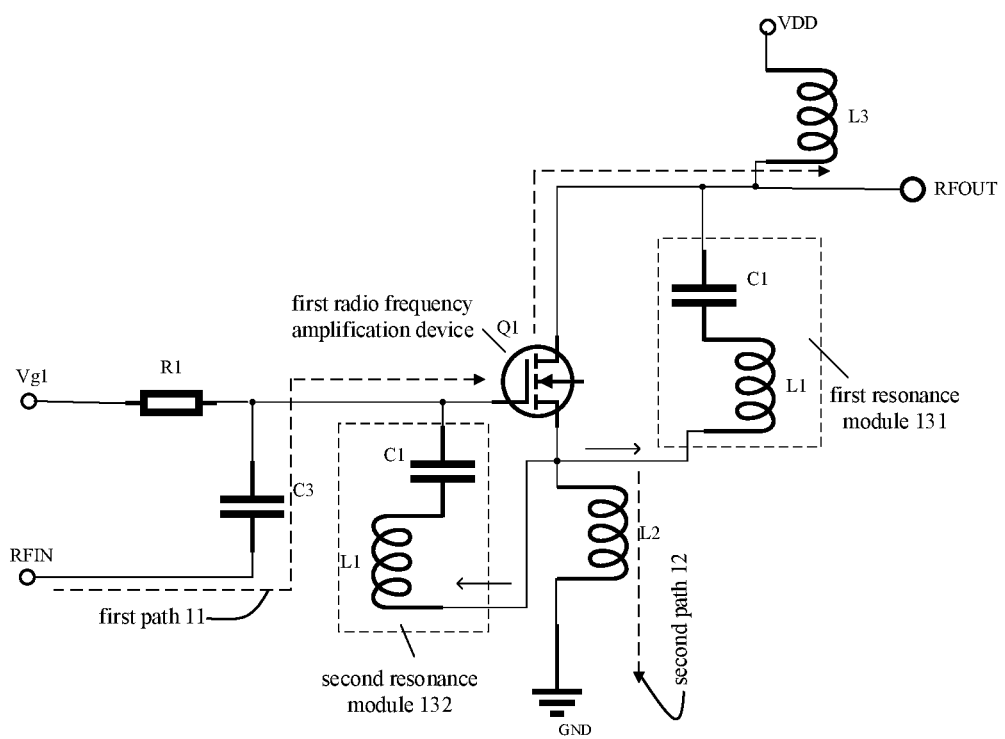
FIG. 5 is a schematic diagram of a third application of the circuit for processing radio frequency signal of an embodiment of the disclosure.

FIG. 5 is a schematic diagram of a third application of the circuit for processing radio frequency signal of an embodiment of the disclosure: in this scenario, the circuit for processing radio frequency signal includes a radio frequency amplification device, which is designated as a first radio frequency amplification device; the circuit for processing radio frequency signal further includes two resonance modules, which are designated as a first resonance module and a second resonance module; Specifically, as illustrated in FIG. 5, the circuit for processing radio frequency signal includes a first path 11 and a second path 12; the first path 11 includes a first radio frequency amplification device Q1, herein, the first radio frequency amplification device Q1 corresponds to the radio frequency amplification device 14 in FIG. 2; a second end (gate) of the first radio frequency amplification device Q1 is connected with an input end (RFIN); a third end (drain) of the first radio frequency amplification device Q1 is connected with an output end (RFOUT); the second path 12 includes a second inductor L2; a first end of the second inductor L2 is connected with a first end (source) of the first radio frequency amplification device Q1; and a second end of the second inductor L2 is grounded.

In some embodiments, the first radio frequency amplification device Q1 is an N-channel enhanced MOSFET device, and in such application scenario, the first radio frequency amplification device Q1 is a common source amplification transistor; in addition, the first radio frequency amplification device Q1 may also be a bipolar junction transistor, i.e. BJT device, and in such application scenario, the first radio frequency amplification device Q1 is a common emitter amplification transistor.

In some embodiments, the second inductor L2 may be a parasitic inductance in some actual circuits or an inductor actually existing in some actual circuits.

In this embodiment, the first resonance module 131 and the second resonance module 132 correspond to the resonance module 13 in FIG. 2, and each of the first resonance module 131 and the second resonance module 132 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 131 is connected with the third end (drain) of the first radio frequency amplification device Q1; a second end of the first capacitor C1 of the first resonance module 131 is connected with a first end of the first inductor L1 of the first resonance module 131; and a second end of the first inductor L1 of the first resonance module 131 is connected with the first end (source) of the first radio frequency amplification device Q1 and the first end of the second inductor L2 respectively.

Herein a first end of a first capacitor C1 of the second resonance module 132 is connected with the second end (gate) of the first radio frequency amplification device Q1; a second end of the first capacitor C1 of the second resonance module 132 is connected with a first end of a first inductor L1 of the second resonance module 132; and a second end of the first inductor L1 of the second resonance module 132 is connected with the first end (source) of the first radio frequency amplification device, the second end of the first inductor L1 of the first resonance module 131 and the first end of the second inductor L2 respectively.

This embodiment corresponds to the combination of the solutions illustrated in FIGS. 3 and 4, and the specific description of each of the components in this embodiment may refer to the detailed description with reference to the corresponding component in the first scenario, in which the detailed description of each of the ends of the first radio frequency amplification device Q1 in this embodiment may also refer to that described with reference to the first scenario, which will not be repeated here. The resonance current generated by the first resonance module 131 and the second resonance module 132 may refer to the direction of the arrow in FIG. 5.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the superimposed use of the combination of two resonance modules, that is opposite to the radio frequency current generated through the parasitic capacitance of the radio frequency amplification device, the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Fourth Scenario

Figure 6:
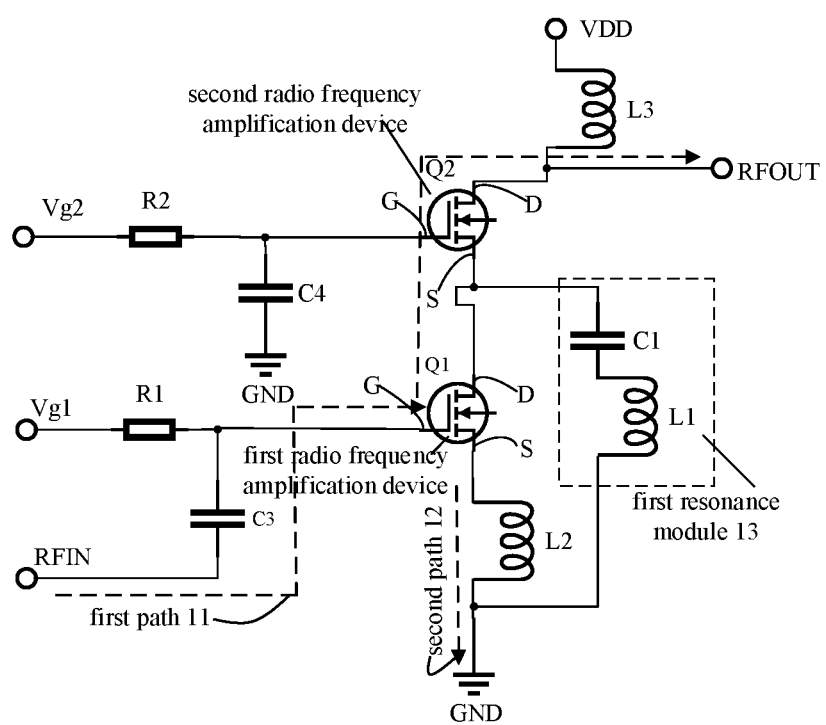
FIG. 6 is a schematic diagram of a fourth application of the circuit for processing radio frequency signal of an embodiment of the disclosure.

FIG. 6 is a schematic diagram of a fourth application of the circuit for processing radio frequency signal of an embodiment of the disclosure: in this scenario, the circuit for processing radio frequency signal includes two radio frequency amplification devices, which are designated as a first radio frequency amplification device and a second radio frequency amplification device; the circuit for processing radio frequency signal further includes a resonance module, which is designated as a first resonance module. Specifically, as illustrated in FIG. 6, the circuit for processing radio frequency signal includes a first path 11 and a second path 12; the first path 11 includes a first radio frequency amplification device Q1 and a second radio frequency amplification device Q2, herein, the first radio frequency amplification device Q1 and the second radio frequency amplification device Q2 correspond to the radio frequency amplification device 14 in FIG. 2; a second end of the first radio frequency amplification device Q1 is connected with an input end (RFIN); a first end of the second radio frequency amplification device Q2 is connected in series with a third end of the first radio frequency amplification device Q1; a third end of the second radio frequency amplification device Q2 is connected with an output end (RFOUT); the second path 12 includes a second inductor L2; a first end of the second inductor L2 is connected with a first end of the first radio frequency amplification device Q1; and a second end of the second inductor L2 is grounded. Here, referring to FIG. 6, the first end of the first radio frequency amplification device Q1 corresponds to the source, which is designated by S in the figure, and the second end of the first radio frequency amplification device Q1 corresponds to the gate, which is designated by G in the figure, and the third end of the first radio frequency amplification device Q1 corresponds to the drain, which is designated by D in the figure. In addition, the first end of the second radio frequency amplification device Q2 corresponds to the source, which is designated by S in the figure, and a second end of the second radio frequency amplification device Q2 corresponds to the gate, which is designated by G in the figure, and the third end of the second radio frequency amplification device Q2 corresponds to the drain, which is designated by D in the figure.

In some embodiments, each of the first radio frequency amplification device Q1 and the second radio frequency amplification device Q2 may be an N-channel enhanced MOSFET device and in such application scenario, the first radio frequency amplification device Q1 is a common source amplification transistor, and the second radio frequency amplification device Q2 is a common gate amplification transistor; in addition, each of the first radio frequency amplification device Q1 and the second radio frequency amplification device Q2 may also be a bipolar junction transistor, i.e. BJT device, and in such application scenario, the first radio frequency amplification device Q1 is a common emitter amplification transistor and the second radio frequency amplification device Q2 is a common base amplification transistor.

In some embodiments, the second inductor L2 may be a parasitic inductance in some actual circuits or an inductor actually existing in some actual circuits.

In this embodiment, the first resonance module 13 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 13 is connected with the third end (drain) of the first radio frequency amplification device Q1 and the first end (source) of the second radio frequency amplification device Q2 respectively; a second end of the first capacitor C1 of the first resonance module 13 is connected with a first end of the first inductor L1 of the first resonance module 13; and a second end of the first inductor L1 of the first resonance module 13 is connected with the second end of the second inductor L2 and the ground respectively.

In this embodiment, the first capacitor C1 and the first inductor L1 are connected in series to form the first resonance module 13, and the first capacitor C1 needs to be selected to have a larger value to play a role of isolating DC. In some embodiments, the first capacitor C1 should be selected to have the value as large as possible within the operating frequency range in which the first radio frequency amplification device Q1 and the second radio frequency amplification device Q2 are located, provided that the operating frequency of the resonance module is lower than the operating frequencies of the first radio frequency amplification device Q1 and the second radio frequency amplification device Q2 (e.g., the operating frequency of the resonance module is lower than one-tenth of the operating frequencies of the first radio frequency amplification device Q1 and the second radio frequency amplification device Q2) to enhance the resonant effect of the resonance module; and since the first capacitor C1 and the first inductor L1 are connected in series to form a resonance module (the first resonance module 13 in this embodiment), the superimposed reactance value of the resonance module will be equal to the reciprocal of the value of the first capacitor C1 plus the value of the first inductor L1, and when the operating frequency of the resonance module is greater than the resonance frequency, the superimposition of the first capacitor C1 and the first inductor L1 in series is equivalent to the effect of the first inductor L1; and when the operating frequency of the resonance module is less than the resonance frequency, the superimposition of the first capacitor C1 and the first inductor L1 in series is equivalent to the effect of the first capacitor C1. Herein, a first resonance module 13 including the first capacitor C1 and the first inductor L1 is configured to generate a resonance current, and when the resonance frequency of the resonance module 13 is less than the operating frequency of the circuit and the first capacitor C1 and the first inductor L1 are equivalent to an inductor, the current generated by the first resonance module 13 is opposite to the radio frequency current generated by the parasitic capacitance of the first radio frequency amplification device Q1, and the resonance current generated by the first resonance module 13 is illustrated by the direction of the arrow in FIG. 6. Therefore, the two currents will offset with each other.

In some embodiments, as illustrated in FIG. 6, the circuit for processing radio frequency signal further includes a first AC isolating resistor R1, a second AC isolating resistor R2, a first DC isolating capacitor C3, a second DC isolating capacitor C4 and a first AC isolating inductor L3; herein, a first end of the first AC isolating resistor R1 is connected with a first bias voltage input end (Vg1), and a second end of the first AC isolating resistor R1 is connected with the second end (gate) of the first radio frequency amplification device Q1; the first DC isolating capacitor C3 is connected in series between the second end (gate) of the first radio frequency amplification device Q1 and the input end (RFIN); a first end of the second AC isolating resistor R2 is connected with a second bias voltage input end (Vg2), and a second end of the second AC isolating resistor R2 is connected with the second end (gate) of the second radio frequency amplification device Q2; the second DC isolating capacitor C4 is connected in series between the second end (gate) of the second radio frequency amplification device Q2 and ground; a first end of the first AC isolating inductor L3 is connected with the third end (drain) of the second radio frequency amplification device Q2, and a second end of the first AC isolating inductor L3 is connected with the drain power supply voltage VDD. The first bias voltage input end (Vg1) and the second bias voltage input end (Vg2) are configured to provide a proper bias voltage for the first radio frequency amplification device Q1 and the second radio frequency amplification device Q2 to make the first radio frequency amplification device Q1 and the second radio frequency amplification device Q2 operate in a required operating state, thereby ensuring that each of the ends of the first radio frequency amplification device Q1 and the second radio frequency amplification device Q2 operates in a stable state; the first AC isolating resistor R1 and the second AC isolating resistor R2 are configured to isolate the first bias voltage input end (Vg1) and the second bias voltage input end (Vg2) from the radio frequency AC signal input by the radio frequency signal input end (RFIN); herein, the AC isolating resistor may be replaced by an AC isolating inductor in the circuit; the first DC isolating capacitor C3 and the second DC isolating capacitor C4 are configured to prevent the bias DC from flowing into the ground or into the radio frequency signal input end (RFIN); the first AC isolating inductor L3 is configured to isolate the drain power supply voltage (VDD) from the radio frequency AC signal, so that all radio frequency AC signals are output via the radio frequency signal output end (RFOUT).

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the resonance module, that is opposite to the radio frequency current generated through the parasitic capacitance of the radio frequency amplification device, the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit, effectively improving the gain of the circuit, improving the operating efficiency of the system.

Fifth Scenario

Figure 7:
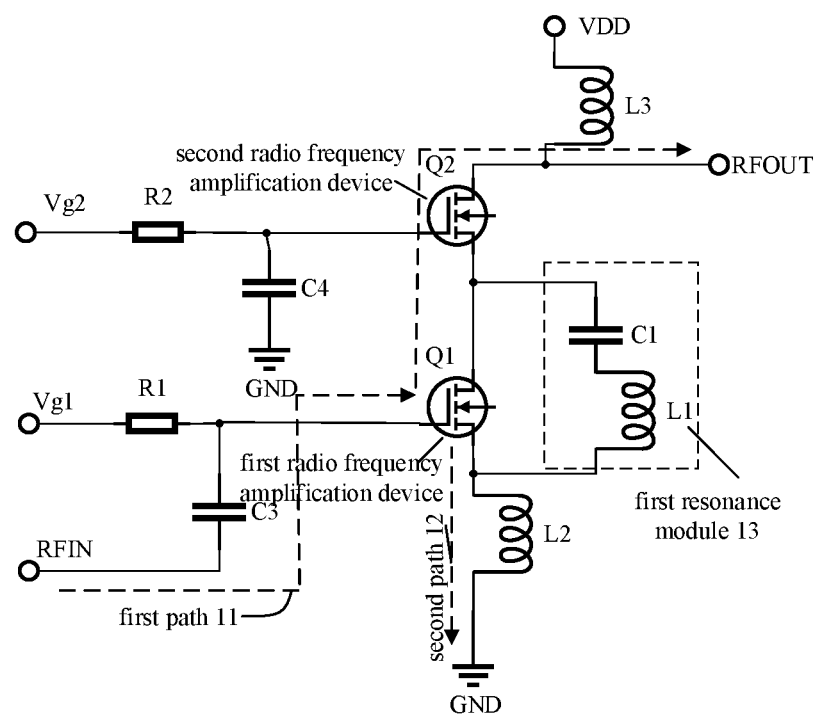
FIG. 7 is a schematic diagram of a fifth application of the circuit for processing radio frequency signal of an embodiment of the disclosure.

FIG. 7 is a schematic diagram of a fifth application of the circuit for processing radio frequency signal of an embodiment of the disclosure: in this scenario, the circuit for processing radio frequency signal includes two radio frequency amplification devices, which are designated as a first radio frequency amplification device and a second radio frequency amplification device; the circuit for processing radio frequency signal further includes a resonance module, which is designated as a first resonance module. Specifically, as illustrated in FIG. 7, the circuit for processing radio frequency signal includes a first path 11 and a second path 12; the first path 11 includes a first radio frequency amplification device Q1 and a second radio frequency amplification device Q2, herein, the first radio frequency amplification device Q1 and the second radio frequency amplification device Q2 correspond to the radio frequency amplification device 14 in FIG. 2; a second end (gate) of the first radio frequency amplification device Q1 is connected with an input end (RFIN); a first end (source) of the second radio frequency amplification device Q2 is connected in series with a third end (drain) of the first radio frequency amplification device Q1; a third end (drain) of the second radio frequency amplification device Q2 is connected with an output end (RFOUT); the second path 12 includes a second inductor L2; a first end of the second inductor L2 is connected with a first end (source) of the first radio frequency amplification device Q1; and a second end of the second inductor L2 is grounded.

In some embodiments, each of the first radio frequency amplification device Q1 and the second radio frequency amplification device Q2 may be an N-channel enhanced MOSFET device and in such application scenario, the first radio frequency amplification device Q1 is a common source amplification transistor, and the second radio frequency amplification device Q2 is a common gate amplification transistor; in addition, each of the first radio frequency amplification device Q1 and the second radio frequency amplification device Q2 may also be a bipolar junction transistor, i.e. BJT device, and in such application scenario, the first radio frequency amplification device Q1 is a common emitter amplification transistor and the second radio frequency amplification device Q2 is a common base amplification transistor.

In some embodiments, the second inductor L2 may be a parasitic inductance in some actual circuits or an inductor actually existing in some actual circuits.

In this embodiment, the first resonance module 13 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 13 is connected with the third end (drain) of the first radio frequency amplification device Q1; a second end of the first capacitor C1 of the first resonance module 13 is connected with a first end of the first inductor L1 of the first resonance module 13; and a second end of the first inductor L1 of the first resonance module 13 is connected with the first end (source) of the first radio frequency amplification device Q1 and the first end of the second inductor L2 respectively.

Furthermore, since the first end of the second inductor L2 is connected with the first end (source) of the first radio frequency amplification device Q1, and the second end of the second inductor L2 is grounded, thus forming negative feedback at the source of the radio frequency amplification device; and by connecting the first resonance module 13 in parallel with the first end (source) of the first radio frequency amplification device Q1, the radio frequency signal flowing into the second inductor L2 may be reduced, which is equivalent to reducing the inductance of the first inductor L1 and obtaining a further gain improvement. In addition, the power gain of the first radio frequency amplification device Q1 is inversely proportional to the real part of the input admittance of the first resonance module 13, and an inductance value of the first inductor L1 is properly selected and determined based on the operating frequency of the first radio frequency amplification device Q1 and the value of the parasitic capacitance of the first radio frequency amplification device Q1 itself to reduce the real part of the input admittance and to increase the power gain of the radio frequency amplification device.

The specific description of each of the components in this embodiment may refer to the detailed description with reference to the corresponding component in the fourth scenario, in which the detailed description of each of the ends of the first radio frequency amplification device Q1 and the second radio frequency amplification device Q2 in this embodiment may also refer to that described with reference to the fourth scenario, which will not be repeated here. The resonance current generated by the first resonance module 13 may refer to the direction of the arrow in FIG. 7.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the resonance module, that is opposite to the radio frequency current generated through the parasitic capacitance of the radio frequency amplification device, the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Sixth Scenario

Figure 8:
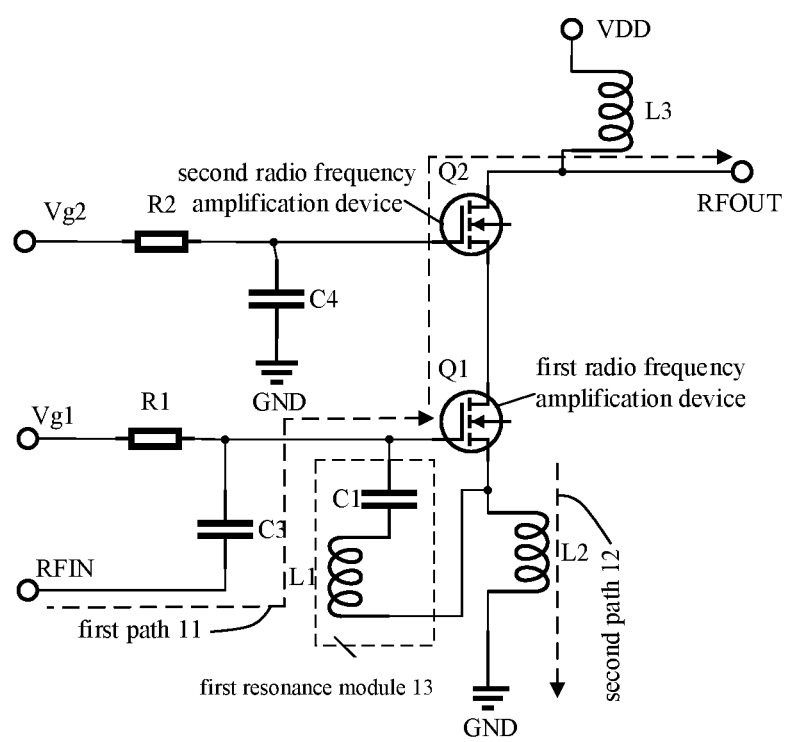
FIG. 8 is a schematic diagram of a sixth application of the circuit for processing radio frequency signal of an embodiment of the disclosure.

FIG. 8 is a schematic diagram of a sixth application of the circuit for processing radio frequency signal of an embodiment of the disclosure: in this scenario, the circuit for processing radio frequency signal includes two radio frequency amplification devices, which are designated as a first radio frequency amplification device and a second radio frequency amplification device; the circuit for processing radio frequency signal further includes a resonance module, which is designated as a first resonance module. Specifically, as illustrated in FIG. 8, the circuit for processing radio frequency signal includes a first path 11 and a second path 12; the first path 11 includes a first radio frequency amplification device Q1 and a second radio frequency amplification device Q2, herein, the first radio frequency amplification device Q1 and the second radio frequency amplification device Q2 correspond to the radio frequency amplification device 14 in FIG. 2; a second end (gate) of the first radio frequency amplification device Q1 is connected with an input end (RFIN); a first end (source) of the second radio frequency amplification device Q2 is connected in series with a third end (drain) of the first radio frequency amplification device Q1; a third end (drain) of the second radio frequency amplification device Q2 is connected with an output end (RFOUT); the second path 12 includes a second inductor L2; a first end of the second inductor L2 is connected with a first end (source) of the first radio frequency amplification device Q1; and a second end of the second inductor L2 is grounded.

In some embodiments, each of the first radio frequency amplification device Q1 and the second radio frequency amplification device Q2 may be an N-channel enhanced MOSFET devices, and in such application scenario, the first radio frequency amplification device Q1 is a common source amplification transistor, and the second radio frequency amplification device Q2 is a common gate amplification transistor; in addition, each of the first radio frequency amplification device Q1 and the second radio frequency amplification device Q2 may also be a bipolar junction transistor, i.e. BJT device, and in such application scenario, the first radio frequency amplification device Q1 is a common emitter amplification transistor and the second radio frequency amplification device Q2 is a common base amplification transistor.

In some embodiments, the second inductor L2 may be a parasitic inductance in some actual circuits or an inductor actually existing in some actual circuits.

In this embodiment, the first resonance module 13 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 13 is connected with the second end (gate) of the first radio frequency amplification device Q1; a second end of the first capacitor C1 of the first resonance module 13 is connected with a first end of the first inductor L1 of the first resonance module 13; and a second end of the first inductor L1 of the first resonance module 13 is connected with the first end (source) of the first radio frequency amplification device Q1 and the first end of the second inductor L2 respectively.

The specific description of each of the components in this embodiment may refer to the detailed description with reference to the corresponding component in the fourth scenario and the fifth scenario, in which the detailed description of each of the ends of the first radio frequency amplification device Q1 and the second radio frequency amplification device Q2 in this embodiment may also refer to that described with reference to the fourth scenario, which will not be repeated here. The resonance current generated by the first resonance module 13 may refer to the direction of the arrow in FIG. 8.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, to generate a resonance current that is opposite to the radio frequency current generated through the parasitic capacitance of the radio frequency amplification device, the resonance current is offset, through the resonance module, with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Seventh Scenario

Figure 9:
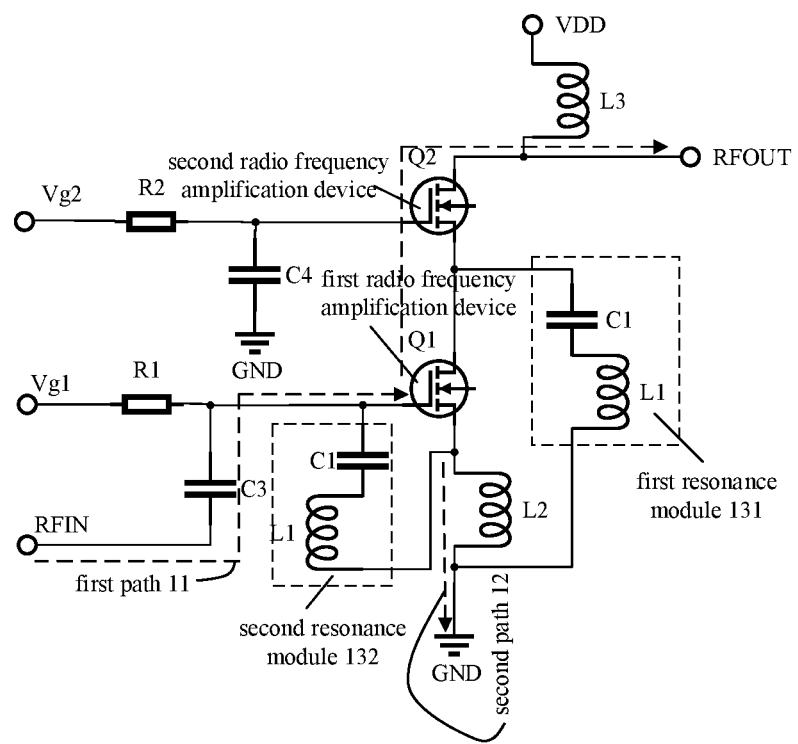
FIG. 9 is a schematic diagram of a seventh application of the circuit for processing radio frequency signal of an embodiment of the disclosure.

FIG. 9 is a schematic diagram of a seventh application of the circuit for processing radio frequency signal of an embodiment of the disclosure: in this scenario, the circuit for processing radio frequency signal includes two radio frequency amplification devices, which are designated as a first radio frequency amplification device and a second radio frequency amplification device; the circuit for processing radio frequency signal further includes two resonance modules, which are designated as a first resonance module and a second resonance module. Specifically, as illustrated in FIG. 9, the circuit for processing radio frequency signal includes a first path 11 and a second path 12; the first path 11 includes a first radio frequency amplification device Q1 and a second radio frequency amplification device Q2, herein, the first radio frequency amplification device Q1 and the second radio frequency amplification device Q2 correspond to the radio frequency amplification device 14 in FIG. 2; a second end (gate) of the first radio frequency amplification device Q1 is connected with an input end (RFIN); a first end (source) of the second radio frequency amplification device Q2 is connected in series with a third end (drain) of the first radio frequency amplification device Q1; a third end (drain) of the second radio frequency amplification device Q2 is connected with an output end (RFOUT); the second path 12 includes a second inductor L2; a first end of the second inductor L2 is connected with a first end (source) of the first radio frequency amplification device Q1; and a second end of the second inductor L2 is grounded.

In some embodiments, each of the first radio frequency amplification device Q1 and the second radio frequency amplification device Q2 may be an N-channel enhanced MOSFET devices, and in such application scenario, the first radio frequency amplification device Q1 is a common source amplification transistor, and the second radio frequency amplification device Q2 is a common gate amplification transistor; in addition, each of the first radio frequency amplification device Q1 and the second radio frequency amplification device Q2 may also be a bipolar junction transistor, i.e. BJT device, and in such application scenario, the first radio frequency amplification device Q1 is a common emitter amplification transistor and the second radio frequency amplification device Q2 is a common base amplification transistor. In an embodiment, the second inductor L2 may be a parasitic inductance in some actual circuits or an inductor actually existing in some actual circuits.

In this embodiment, the first resonance module 131 and the second resonance module 132 correspond to the resonance module 13 in FIG. 1, and each of the first resonance module 131 and the second resonance module 132 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 131 is connected with the third end (drain) of the first radio frequency amplification device Q1 and the first end (source) of the second radio frequency amplification device Q2 respectively; a second end of the first capacitor C1 of the first resonance module 131 is connected with a first end of the first inductor L1 of the first resonance module 131; and a second end of the first inductor L1 of the first resonance module 131 is connected with the second end of the second inductor L2 and the ground respectively.

Herein a first end of a first capacitor C1 of the second resonance module 132 is connected with the second end (gate) of the first radio frequency amplification device Q1; a second end of the first capacitor C1 of the second resonance module 132 is connected with a first end of a first inductor L1 of the second resonance module 132; and a second end of the first inductor L1 of the second resonance module 132 is connected with the first end (source) of the first radio frequency amplification device Q1 and the first end of the second inductor L2 respectively.

This embodiment corresponds to the combination of the solutions illustrated in FIGS. 6 and 8, and the specific description of each of the components in this embodiment may refer to the detailed description with reference to the corresponding component in the fourth scenario and the fifth scenario, in which the detailed description of each of the ends of the first radio frequency amplification device Q1 and the second radio frequency amplification device Q2 in this embodiment may also refer to that described with reference to the fourth scenario, which will not be repeated here. The resonance current generated by the first resonance module 131 and the second resonance module 132 may refer to the direction of the arrow in FIG. 9.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and by generating a resonance current, through the superimposed use of the combination of two resonance modules, that is opposite to the radio frequency current generated through the parasitic capacitance of the radio frequency amplification device, the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Eighth Scenario

Figure 10:
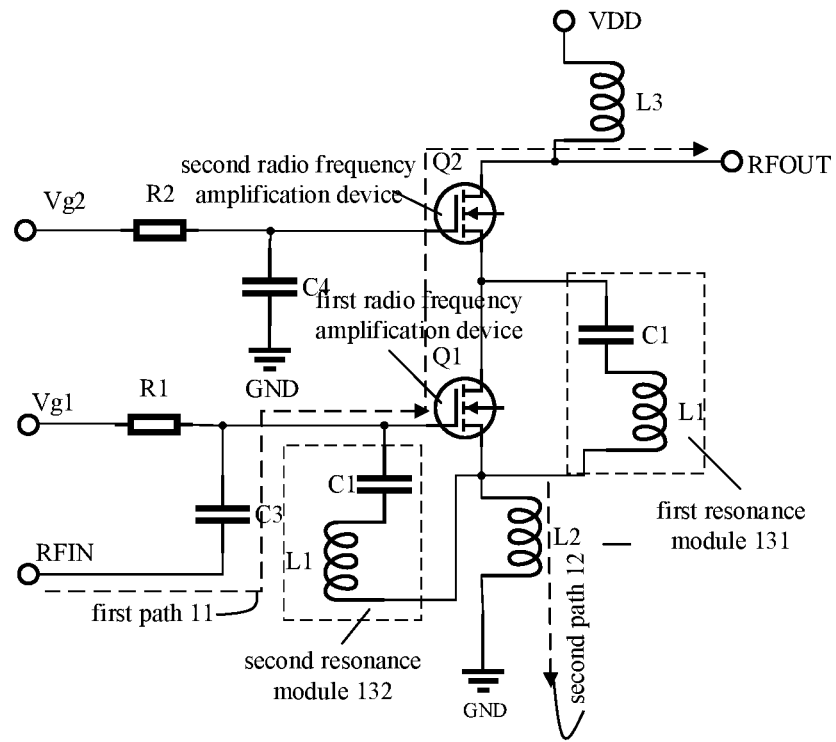
FIG. 10 is a schematic diagram of an eighth application of the circuit for processing radio frequency signal of an embodiment of the disclosure.

FIG. 10 is a schematic diagram of an eighth application of the circuit for processing radio frequency signal of an embodiment of the disclosure: in this scenario, the circuit for processing radio frequency signal includes two radio frequency amplification devices, which are designated as a first radio frequency amplification device Q1 and a second radio frequency amplification device Q2 respectively; the circuit for processing radio frequency signal further includes two resonance modules, which are designated as a first resonance module and a second resonance module. Specifically, as illustrated in FIG. 10, the circuit for processing radio frequency signal includes a first path 11 and a second path 12; the first path 11 includes a first radio frequency amplification device Q1 and a second radio frequency amplification device Q2, herein, the first radio frequency amplification device Q1 and the second radio frequency amplification device Q2 correspond to the radio frequency amplification device 14 in FIG. 2; a second end (gate) of the first radio frequency amplification device Q1 is connected with an input end (RFIN); a first end (source) of the second radio frequency amplification device Q2 is connected in series with a third end (drain) of the first radio frequency amplification device Q1; the second path 12 includes a second inductor L2; a first end of the second inductor L2 is connected with a first end (source) of the first radio frequency amplification device Q1; and a second end of the second inductor L2 is grounded.

In some embodiments, each of the first radio frequency amplification device Q1 and the second radio frequency amplification device Q2 is an N-channel enhanced MOSFET devices, and in such application scenario, the first radio frequency amplification device Q1 is a common source amplification transistor, and the second radio frequency amplification device Q2 is a common gate amplification transistor; in addition, each of the first radio frequency amplification device Q1 and the second radio frequency amplification device Q2 may also be a bipolar junction transistor, i.e. BJT device, and in such application scenario, the first radio frequency amplification device Q1 is a common emitter amplification transistor and the second radio frequency amplification device Q2 is a common base amplification transistor.

In some embodiments, the second inductor L2 may be a parasitic inductance in some actual circuits or an inductor actually existing in some actual circuits.

In this embodiment, the first resonance module 131 and the second resonance module 132 correspond to the resonance module 13 in FIG. 1, and each of the first resonance module 131 and the second resonance module 132 includes a first capacitor C1 and a first inductor L1; a first end of the first capacitor C1 is connected with the first path 11; a second end of the first capacitor C1 is connected with a first end of the first inductor L1; and a second end of the first inductor L1 is connected with the second path 12.

Herein a first end of the first capacitor C1 of the first resonance module 131 is connected with the third end (drain) of the first radio frequency amplification device Q1 and the first end (source) of the second radio frequency amplification device Q2 respectively; a second end of the first capacitor C1 of the first resonance module 131 is connected with a first end of the first inductor L1 of the first resonance module 131; and a second end of the first inductor L1 of the first resonance module 131 is connected with the first end (source) of the first radio frequency amplification device Q1 and the first end of the second inductor L2 respectively.

Herein a first end of a first capacitor C1 of the second resonance module 132 is connected with the second end (gate) of the first radio frequency amplification device Q1; a second end of the first capacitor C1 of the second resonance module 132 is connected with a first end of a first inductor L1 of the second resonance module 132; and a second end of the first inductor L1 of the second resonance module 132 is connected with the first end (source) of the first radio frequency amplification device Q1, the second end of the first inductor L1 of the first resonance module 131 and the first end of the second inductor L2 respectively.

This embodiment corresponds to the combination of the solutions illustrated in FIGS. 7 and 8, and the specific description of each of the components in this embodiment may refer to the detailed description with reference to the corresponding component in the fourth scenario and the fifth scenario, in which the detailed description of each of the ends of the first radio frequency amplification device Q1 and the second radio frequency amplification device Q2 in this embodiment may also refer to that described with reference to the fourth scenario, which will not be repeated here. The resonance current generated by the first resonance module 131 and the second resonance module 132 may refer to the direction of the arrow in FIG. 10.

According to the technical solutions of the embodiments of the disclosure, when the radio frequency signal in the circuit for processing radio frequency signal flows from the radio frequency signal input end (RFIN) to the radio frequency signal output end (RFOUT) via the radio frequency amplification device, by setting a resonance module in the circuit for processing radio frequency signal, and through the superimposed use of the combination of two resonance modules, not only the equivalent inductance of L1 is reduced, but also a resonance current that is opposite to the radio frequency current generated through the parasitic capacitance of the radio frequency amplification device is generated, so that the resonance current is offset with the radio frequency current generated through the parasitic capacitance, thereby reducing the radio frequency signal current flowing into the second path of the radio frequency amplification circuit, increasing the radio frequency signal current of the first path, thus reducing the effect of parasitic capacitance on the gain of the circuit and improving the gain and amplification power of the radio frequency amplification device, so that the required amplification power may be realized with fewer stages of amplification devices, thus making the structure of the system simpler and improving the efficiency of the system.

Figure 11:
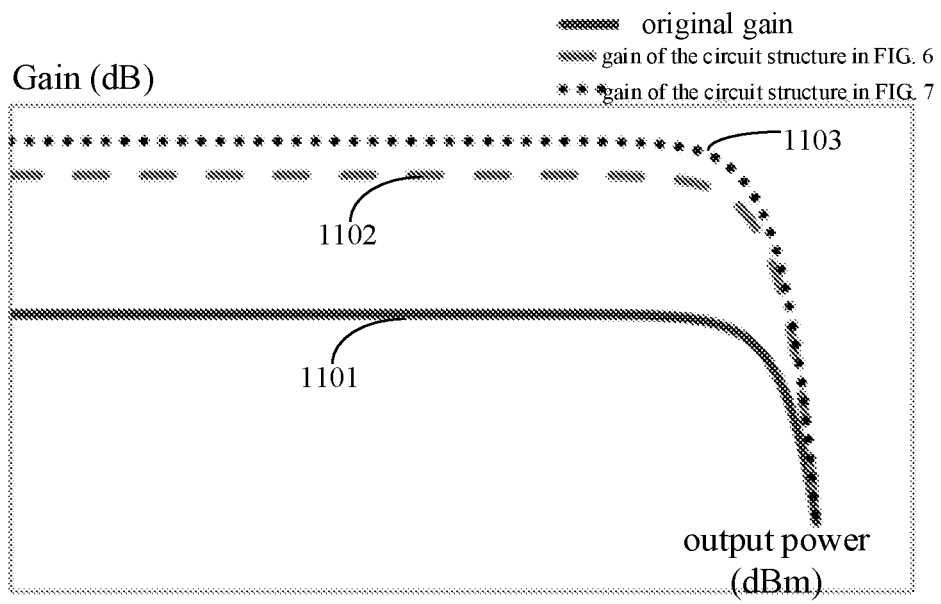
FIG. 11 is a schematic diagram of a gain effect achieved by the circuit for processing radio frequency signal of an embodiment of the disclosure.

FIG. 11 is a schematic diagram of a gain effect achieved by the circuit for processing radio frequency signal of an embodiment of the disclosure: including, for example, gain achieved by the embodiments corresponding to FIGS. 6 and 7. Herein, the horizontal axis is output power (Pout) of the circuit for processing radio frequency signal, the longitudinal axis is gain (Gain) of the radio frequency amplification circuit, and the original gain achieved by the conventional circuit for processing radio frequency signal is illustrated by the solid line 1101 in the figure, the curve of the gain achieved by the circuit for processing radio frequency signal of the embodiment corresponding to FIG. 6 is illustrated by the dash line 1102, and the curve of the gain achieved by the circuit for processing radio frequency signal of the embodiment corresponding to FIG. 7 is illustrated by the dash line 1103. It may be seen that through the technical solutions of the embodiments of the disclosure, the gain of the circuit is effectively improved, and the gain for the range from low output power to high output power is improved. In addition, by connecting the resonance module in parallel with a first end (source) of the first amplification device, the radio frequency signal flowing into the second inductor L2 is reduced, which is equivalent to reducing the inductance of L1 and obtaining a further gain improvement.

Ninth Scenario

Figure 12:
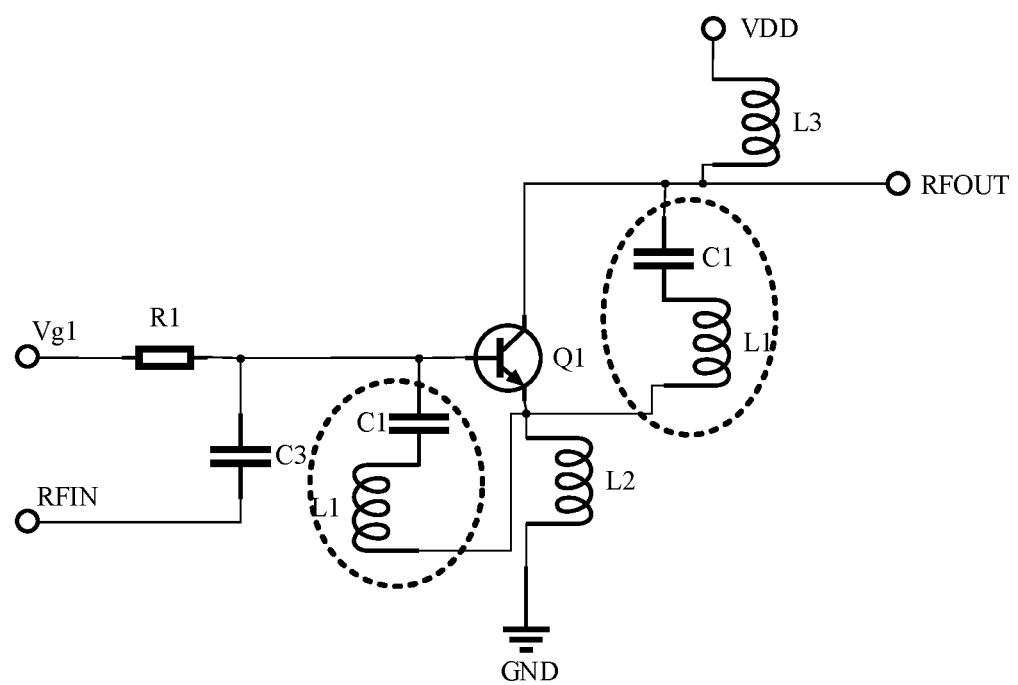
FIG. 12 is a schematic diagram of a ninth application of the circuit for processing radio frequency signal of an embodiment of the disclosure.
Figure 13:
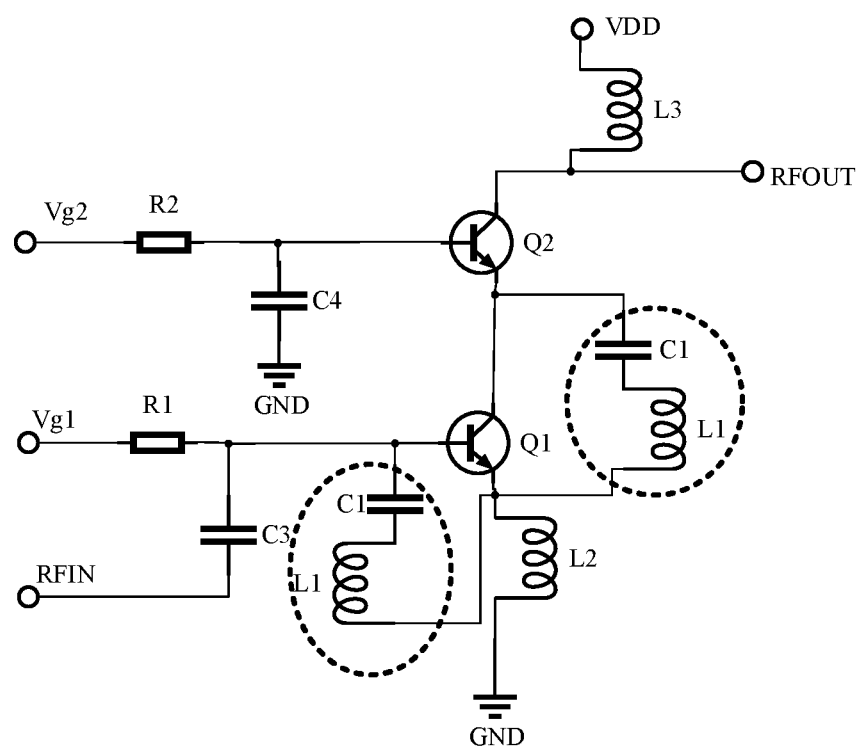
FIG. 13 is a schematic diagram of a tenth application of the circuit for processing radio frequency signal of an embodiment of the disclosure.

FIG. 12 is a schematic diagram of a ninth application of the circuit for processing radio frequency signal of an embodiment of the disclosure, and FIG. 13 is a schematic diagram of a tenth application of the circuit for processing radio frequency signal of an embodiment of the disclosure.

To distinguish from the above-described scenarios, the circuits for processing radio frequency signal illustrated in FIGS. 12 and 13 are examples in which the radio frequency amplification device of the circuit for processing radio frequency signal of the embodiments adopts the BJT, therefore, FIGS. 12 and 13 illustrate the schematic structural diagrams of the circuit, in which the radio frequency amplification device is a BJT transistor, of the circuit for processing radio frequency signal of the embodiments of the disclosure, herein, the circuit for processing radio frequency signal illustrated in FIG. 12 may specifically refer to the detailed description with reference to the circuit for processing radio frequency signal illustrated in FIG. 5, and the circuit for processing radio frequency signal illustrated in FIG. 13 may specifically refer to the detailed description with reference to the circuit for processing radio frequency signal illustrated in FIG. 10.

The above descriptions are only specific implementations of the disclosure, but the protection scope of the disclosure is not limited to thereto, and any technicians familiar with this technical field may easily conceive of changes or substitutions within the technical scope disclosed in the disclosure, which should be covered within the protection scope of the disclosure. Therefore, the protection scope of the disclosure shall be based on the protection scope of the claims.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A circuit for processing a radio frequency signal, comprising:
    a first path;
    at least one second path; and
    at least one resonance module, wherein
    the first path comprises at least one radio frequency amplification device;
    one end of the at least one second path is connected with the first path through the at least one radio frequency amplification device;
    another end of the at least one second path is grounded;
    a first radio frequency current generated by parasitic capacitance of the at least one radio frequency amplification device flows through the at least one second path;
    a first end of each of the at least one resonance module is connected with the first path, and a second end of each of the at least one resonance module is connected with at least a part of second paths of the at least one second path; and
    the at least one resonance module is configured to generate a resonance current opposite to the first radio frequency current.

2. The circuit for processing the radio frequency signal of claim 1, wherein
    the at least one resonance module comprises a first capacitor and a first inductor;
    a first end of the first capacitor is connected with the first path;
    a second end of the first capacitor is connected with a first end of the first inductor; and
    a second end of the first inductor is connected with the at least one second path.

3. The circuit for processing the radio frequency signal of claim 2, wherein
    the at least one radio frequency amplification device comprises a first radio frequency amplification device, a second end of the first radio frequency amplification device is connected with an input end;
    a third end of the first radio frequency amplification device is connected with an output end;
    the at least one second path comprises a second inductor, a first end of the second inductor is connected with a first end of the first radio frequency amplification device, and a second end of the second inductor is grounded;
    the at least one resonance module comprises a first resonance module;
    a first end of a first capacitor of the first resonance module is connected with the third end of the first radio frequency amplification device;
    a second end of the first capacitor of the first resonance module is connected with a first end of a first inductor of the first resonance module; and
    a second end of the first inductor of the first resonance module is connected with the first end of the first radio frequency amplification device and the first end of the second inductor respectively.

4. The circuit for processing the radio frequency signal of claim 3, the at least one resonance module further comprising a second resonance module, wherein
    a first end of a first capacitor of the second resonance module is connected with the second end of the first radio frequency amplification device;
    a second end of the first capacitor of the second resonance module is connected with a first end of a first inductor of the second resonance module; and
    a second end of the first inductor of the second resonance module is connected with the first end of the first radio frequency amplification device, the second end of the first inductor of the first resonance module and the first end of the second inductor respectively.

5. The circuit for processing the radio frequency signal of claim 2, wherein
    the at least one radio frequency amplification device comprises a first radio frequency amplification device;
    a second end of the first radio frequency amplification device is connected with an input end;
    a third end of the first radio frequency amplification device is connected with an output end;
    the at least one second path comprises a second inductor, a first end of the second inductor is connected with a first end of the first radio frequency amplification device, and a second end of the second inductor is grounded;
    the at least one resonance module comprises a first resonance module;
    a first end of a first capacitor of the first resonance module is connected with the second end of the first radio frequency amplification device;
    a second end of the first capacitor of the first resonance module is connected with a first end of a first inductor of the first resonance module; and
    a second end of the first inductor of the first resonance module is connected with the first end of the first radio frequency amplification device and the first end of the second inductor respectively.

6. The circuit for processing the radio frequency signal of claim 2, wherein the at least one radio frequency amplification device comprises a first radio frequency amplification device and a second radio frequency amplification device;

a second end of the first radio frequency amplification device is connected with an input end;

a first end of the second radio frequency amplification device is connected with a third end of the first radio frequency amplification device;

a third end of the second radio frequency amplification device is connected with an output end;

the at least one second path comprises a second inductor, a first end of the second inductor is connected with a first end of the first radio frequency amplification device, and a second end of the second inductor is grounded;

the at least one resonance module comprises a first resonance module;

a first end of a first capacitor of the first resonance module is connected with the third end of the first radio frequency amplification device and the first end of the second radio frequency amplification device respectively;

a second end of the first capacitor of the first resonance module is connected with a first end of a first inductor of the first resonance module; and a second end of the first inductor of the first resonance module is connected with the second end of the second inductor.

7. The circuit for processing the radio frequency signal of claim 6, the at least one resonance module further comprising a second resonance module, wherein
a first end of a first capacitor of the second resonance module is connected with the second end of the first radio frequency amplification device;
a second end of the first capacitor of the second resonance module is connected with a first end of a first inductor of the second resonance module; and
a second end of the first inductor of the second resonance module is connected with the first end of the first radio frequency amplification device and the first end of the second inductor respectively.

8. The circuit for processing the radio frequency signal of claim 2, wherein
the at least one radio frequency amplification device comprises a first radio frequency amplification device and a second radio frequency amplification device;
a second end of the first radio frequency amplification device is connected with an input end;
a first end of the second radio frequency amplification device is connected with a third end of the first radio frequency amplification device;
a third end of the second radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the third end of the first radio frequency amplification device and the first end of the second radio frequency amplification device respectively;

a second end of the first capacitor of the first resonance module is connected with a first end of a first inductor of the first resonance module; and a second end of the first inductor of the first resonance module is connected with the first end of the first radio frequency amplification device and the first end of the second inductor respectively.

9. The circuit for processing the radio frequency signal of claim 8, the at least one resonance module further comprising a second resonance module, wherein
a first end of a first capacitor of the second resonance module is connected with the second end of the first radio frequency amplification device;
a second end of the first capacitor of the second resonance module is connected with a first end of a first inductor of the second resonance module; and
a second end of the first inductor of the second resonance module is connected with the first end of the first radio frequency amplification device, the second end of the first inductor of the first resonance module and the first end of the second inductor respectively.

10. The circuit for processing the radio frequency signal of claim 2, wherein
the at least one radio frequency amplification device comprises a first radio frequency amplification device and a second radio frequency amplification device;
a second end of the first radio frequency amplification device is connected with an input end;
a first end of the second radio frequency amplification device is connected with a third end of the first radio frequency amplification device;
a third end of the second radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the second end of the first radio frequency amplification device;
a second end of the first capacitor of the first resonance module is connected with a first end of a first inductor of the first resonance module; and
a second end of the first inductor of the first resonance module is connected with the first end of the first radio frequency amplification device and the first end of the second inductor respectively.

11. A communication system comprising the circuit for processing the radio frequency signal of claim 1, wherein the at least one resonance current is configured to offset the first radio frequency current generated by the parasitic capacitance of the at least one radio frequency amplification device, thereby reducing the radio frequency signal flowing into the at least one second path, increasing the radio frequency signal of the first path, and reducing effect of parasitic capacitance on the gain of the circuit and improving the gain and amplification power of the at least one radio frequency amplification device.

12. The communication system of claim 11, wherein
the at least one resonance module comprises a first capacitor and a first inductor;
a first end of the first capacitor is connected with the first path;

a second end of the first capacitor is connected with a first end of the first inductor; and
a second end of the first inductor is connected with the at least one second path.

13. The communication system of claim 12, wherein
the at least one radio frequency amplification device comprises a first radio frequency amplification device, a second end of the first radio frequency amplification device is connected with an input end;
a third end of the first radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the third end of the first radio frequency amplification device;
a second end of the first capacitor of the first resonance module is connected with a first end of a first inductor of the first resonance module; and
a second end of the first inductor of the first resonance module is connected with the first end of the first radio frequency amplification device and the first end of the second inductor respectively.

14. The communication system of claim 13, the at least one resonance module further comprising a second resonance module, wherein
a first end of a first capacitor of the second resonance module is connected with the second end of the first radio frequency amplification device;
a second end of the first capacitor of the second resonance module is connected with a first end of a first inductor of the second resonance module; and
a second end of the first inductor of the second resonance module is connected with the first end of the first radio frequency amplification device, the second end of the first inductor of the first resonance module and the first end of the second inductor respectively.

15. The communication system of claim 12, wherein
the at least one radio frequency amplification device comprises a first radio frequency amplification device;
a second end of the first radio frequency amplification device is connected with an input end;
a third end of the first radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the second end of the first radio frequency amplification device;
a second end of the first capacitor of the first resonance module is connected with a first end of a first inductor of the first resonance module; and
a second end of the first inductor of the first resonance module is connected with the first end of the first radio frequency amplification device and the first end of the second inductor respectively.

16. The communication system of claim 12, wherein
the at least one radio frequency amplification device comprises a first radio frequency amplification device and a second radio frequency amplification device;
a second end of the first radio frequency amplification device is connected with an input end;
a first end of the second radio frequency amplification device is connected with a third end of the first radio frequency amplification device;
a third end of the second radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the third end of the first radio frequency amplification device and the first end of the second radio frequency amplification device respectively;
a second end of the first capacitor of the first resonance module is connected with a first end of a first inductor of the first resonance module; and
a second end of the first inductor of the first resonance module is connected with the second end of the second inductor.

17. The communication system of claim 16, the at least one resonance module further comprising a second resonance module, wherein
a first end of a first capacitor of the second resonance module is connected with the second end of the first radio frequency amplification device;
a second end of the first capacitor of the second resonance module is connected with a first end of a first inductor of the second resonance module; and
a second end of the first inductor of the second resonance module is connected with the first end of the first radio frequency amplification device and the first end of the second inductor respectively.

18. The communication system of claim 12, wherein
the at least one radio frequency amplification device comprises a first radio frequency amplification device and a second radio frequency amplification device;
a second end of the first radio frequency amplification device is connected with an input end;
a first end of the second radio frequency amplification device is connected with a third end of the first radio frequency amplification device;
a third end of the second radio frequency amplification device is connected with an output end;
the at least one second path comprises a second inductor, a first end of the second inductor is connected with a first end of the first radio frequency amplification device, and a second end of the second inductor is grounded;
the at least one resonance module comprises a first resonance module;
a first end of a first capacitor of the first resonance module is connected with the third end of the first radio frequency amplification device and the first end of the second radio frequency amplification device respectively;

a second end of the first capacitor of the first resonance module is connected with a first end of a first inductor of the first resonance module; and a second end of the first inductor of the first resonance module is connected with the first end of the first radio frequency amplification device and the first end of the second inductor respectively.

19. The communication system of claim 18, the at least one resonance module further comprising a second resonance module, wherein a first end of a first capacitor of the second resonance module is connected with the second end of the first radio frequency amplification device;

a second end of the first capacitor of the second resonance module is connected with a first end of a first inductor of the second resonance module; and a second end of the first inductor of the second resonance module is connected with the first end of the first radio frequency amplification device, the second end of the first inductor of the first resonance module and the first end of the second inductor respectively.

20. The communication system of claim 12, wherein
the at least one radio frequency amplification device comprises a first radio frequency amplification device and a second radio frequency amplification device;

a second end of the first radio frequency amplification device is connected with an input end;

a first end of the second radio frequency amplification device is connected with a third end of the first radio frequency amplification device;

a third end of the second radio frequency amplification device is connected with an output end;

the at least one second path comprises a second inductor, a first end of the second inductor is connected with a first end of the first radio frequency amplification device, and a second end of the second inductor is grounded;

the at least one resonance module comprises a first resonance module;

a first end of a first capacitor of the first resonance module is connected with the second end of the first radio frequency amplification device;

a second end of the first capacitor of the first resonance module is connected with a first end of a first inductor of the first resonance module; and a second end of the first inductor of the first resonance module is connected with the first end of the first radio frequency amplification device and the first end of the second inductor respectively.

* * * * *